United States Patent
Pandita et al.

(10) Patent No.: US 9,409,570 B2
(45) Date of Patent: Aug. 9, 2016

(54) METHOD AND APPARATUS FOR PREDICTING MOST PROBABLE PATH OF VEHICLE TRAVEL AND VEHICLE CONTROL LOSS PREVIEW

(71) Applicant: Toyota Motor Engineering & Manufacturing North America, Inc., Erlanger, KY (US)

(72) Inventors: Rohit Pandita, Ann Arbor, MI (US); Vladimeros Vladimerou, Ann Arbor, MI (US); Derek S. Caveney, Plymouth, MI (US); David A. Hamilton, Royal Oak, MI (US); John M. McNew, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/273,620

(22) Filed: May 9, 2014

(65) Prior Publication Data

US 2015/0321665 A1     Nov. 12, 2015

(51) Int. Cl.
*B60W 30/00*     (2006.01)
*G01C 21/26*     (2006.01)
*G06K 9/00*     (2006.01)

(52) U.S. Cl.
CPC .............. *B60W 30/00* (2013.01); *G01C 21/26* (2013.01); *G06K 9/00798* (2013.01); *B60W 2550/00* (2013.01)

(58) Field of Classification Search
CPC ................. B60W 2550/402; B60W 30/18154; B60W 2550/00; B60W 30/00; B60W 2550/143; G01C 21/32; G01C 21/26; G01C 21/20
USPC ................................................. 701/409, 532
See application file for complete search history.

(56) References Cited

U.S. PATENT DOCUMENTS

| | | | |
|---|---|---|---|
| 6,278,942 B1 | 8/2001 | McDonough | |
| 7,376,508 B2 | 5/2008 | Barkowski et al. | |
| 2005/0004753 A1* | 1/2005 | Weiland et al. | 701/208 |
| 2011/0098922 A1* | 4/2011 | Ibrahim | 701/208 |
| 2012/0226392 A1* | 9/2012 | Kataoka | 701/1 |
| 2012/0245817 A1 | 9/2012 | Cooprider et al. | |
| 2013/0173150 A1 | 7/2013 | Ghisio | |

FOREIGN PATENT DOCUMENTS

| | | | |
|---|---|---|---|
| DE | 102009024153 A1 | 9/2010 | |
| JP | 2006162409 A | 6/2006 | |
| JP | 2007332794 A | 12/2007 | |
| JP | 4738360 B2 | 8/2008 | |
| JP | 4861851 B2 | 8/2008 | |

* cited by examiner

*Primary Examiner* — Nga X Nguyen
(74) *Attorney, Agent, or Firm* — Christopher G. Darrow; Darrow Mustafa PC

(57) ABSTRACT

A method and apparatus to predict the most probable path of a vehicle along a roadway which may contain a junction splitting the roadway into a rootpath and one or more subpaths, each containing one or more lanes. The method and apparatus also process vehicle sensor information pertaining to driver corrections, road boundary detection, lane marker detection, map information availability, and road surface quality at the current position of the vehicle as well as from previous passes of the vehicle past the same location and other vehicles passing the same location to provide a warning to the driver to retake control of the vehicle if information used by the automatic vehicle control will become unavailable a predetermined travel distance ahead of the current position of the vehicle.

11 Claims, 6 Drawing Sheets

METHOD AND APPARATUS FOR PREDICTING MOST PROBABLE PATH OF VEHICLE TRAVEL AND VEHICLE CONTROL LOSS PREVIEW

BACKGROUND

Partially-automated or monitored driving systems are designed to assist drivers in operating a vehicle safely and efficiently on the road, for example, using techniques such as eye-tracking of the driver to send a warning when the driver becomes inattentive, lane tracking of the vehicle to send a warning to the driver when the vehicle is leaving its lane and controlling vehicle velocity based on distance to a vehicle ahead of the driver when adaptive cruise control is activated by the driver. Fully automated driving systems are designed to operate a vehicle on the road without driver interaction or other external control, for example, self-driving vehicles.

Many GPS positioning based vehicle navigation systems rely on the pre-knowledge of the driver's final destination or a driver chosen route to predict the path the vehicle will likely take through a road junction in a roadway where multiple lanes of the roadway split at the junction into two or more sub-paths each containing one or more lanes. Other GPS position based navigation systems use the GPS position of the vehicle to predict the lane in which the vehicle is traveling to predict a path through a road junction. Other systems use a probabilistic approach using different weights for the functional class of the road, the road name, etc., to predict a vehicle's path through road junctions.

Most probable path prediction is a valuable feature as it can be used in vehicle navigation, or to alert the driver before the vehicle enters the road junction, of road characteristics in one of the sub-paths after the road junction.

In automated vehicle driving systems, advance notice of road conditions after a road junction along the most probable path that the vehicle may take through the junction becomes important if the road surface or surface features, such as lane markers, etc., become unavailable in one of the junction sub-paths thereby requiring the driver to retake control of the vehicle. Advance notice of such potential loss of road identification features that could lead to vehicle control loss is important for vehicle operation.

SUMMARY

A computer implemented method of predicting the most probable path of a vehicle traveling in a multi-lane roadway approaching a junction in the roadway includes the steps of determining, based on input from at least one sensor, a rootpath lane identification of a vehicle traveling in a roadway having a plurality of lanes, identifying an upcoming junction in the roadway forward of the vehicle, where the number of lanes in the roadway changes at the upcoming junction into a rootpath and at least one sub-path, the at least one sub-path having at least one lane, and determining a most probable path of the vehicle at the upcoming junction based on the rootpath lane identity, the number of lanes in the at least one sub-path after the upcoming junction, the number of lanes in the rootpath before the junction, the number of lanes in the rootpath after the junction, and the direction of the at least one sub-path with respect to the rootpath at the junction.

The step of determining the most probable path of the vehicle further includes determining the number of lanes in the roadway before the upcoming junction, determining the number of lanes in a rootpath of a vehicle after the upcoming junction and determining the number of lanes in the at least one sub-path after the upcoming junction.

The method includes determining an angular direction of the at least one sub-path relative to the rootpath of the vehicle. The step of determining the angular direction of the at least one sub-path includes determining one of a left hand sub-path direction and a right hand sub-path direction with respect to the rootpath of the vehicle.

The method includes determining the most probable path of the vehicle at the upcoming junction depending upon the angular direction of the at least one sub-path after the junction, and comparing the rootpath lane identity of the vehicle with at least certain of the lane numbers to determine if the sub-path is or is not the most probable path of the vehicle after the junction.

The method further includes the step of determining a rootpath lane identity of a vehicle in a roadway by assigning incremental unique lane numbers starting with one of the left most and right most lanes of the roadway for each lane in the roadway to the other of the right most and left most lane in the roadway.

The method further includes outputting roadway related information to a vehicle driver for the most probable path of the vehicle after the upcoming junction prior to the vehicle reaching the upcoming junction.

A driver assistance apparatus includes at least one sensor disposed on a vehicle for detecting roadway lane markers, a computing device in communication with the at least one sensor and including at least one processor for controlling the operation of the computing device, a memory for storing data and program instructions used by the at least one processor, wherein the at least one processor is configured to execute instructions stored in the memory to roadway, based on input from the at least one sensor, determine a rootpath lane identification of the vehicle traveling in the roadway, using map data and the current location of the vehicle, identify an upcoming junction in the road where the number of lanes in the roadway changes at the upcoming junction into a rootpath and at least one sub-path, the at least one sub-path having at least one lane, and determine a most probable path of the vehicle based on the rootpath lane identification and the number of lanes in the at least one sub-path after the upcoming junction.

The driver assistance apparatus further includes determining an angular direction of the at least one sub-path relative to the current roadway in which the vehicle is traveling and, depending upon the angular direction of the at least one sub-path after the junction, comparing the rootpath lane identity of the vehicle with at least certain of the lane numbers to determine if the at least one sub-path is or is not the most probable path of the vehicle after the junction.

A computer implemented method of predicting automated vehicle control loss includes determining, based on from at least one sensor disposed on the vehicle, a rootpath lane identification of a vehicle traveling in a roadway containing a plurality of lanes, determining a most probable path of the vehicle along the roadway forward of the vehicle, based on sensor output records stored in a memory of a computing device and associated with a next predetermined travel distance of the vehicle along the roadway, determining if vehicle control information will be unavailable for a predetermined time interval, and when the vehicle control information is determined to be unavailable, sending an indication to a driver to take control of the vehicle.

The method further includes the sensor records of driver corrections, road boundary detection, lane marker availability, satellite space navigation availability and road surface quality detection.

The method allows access to the record database by a plurality of vehicles.

The step of determining the most probable path of the vehicle includes determining the rootpath lane identification of the vehicle traveling in a roadway having a plurality lanes, identify an upcoming junction in the roadway forward of the vehicle, where the number of lanes in the roadway changes at the upcoming junction into a rootpath and at least one sub-path, the at least one sub-path having at least one lane, and determining the most probable path of the vehicle at the upcoming junction based on the rootpath lane identification and the number of lanes in at least one sub-path after the upcoming junction.

BRIEF DESCRIPTION OF THE DRAWING

The various features, advantages and other uses of the present method and apparatus will become more apparent by referring to the following detailed description and drawing in which.

DETAILED DESCRIPTION

Figure 1A:
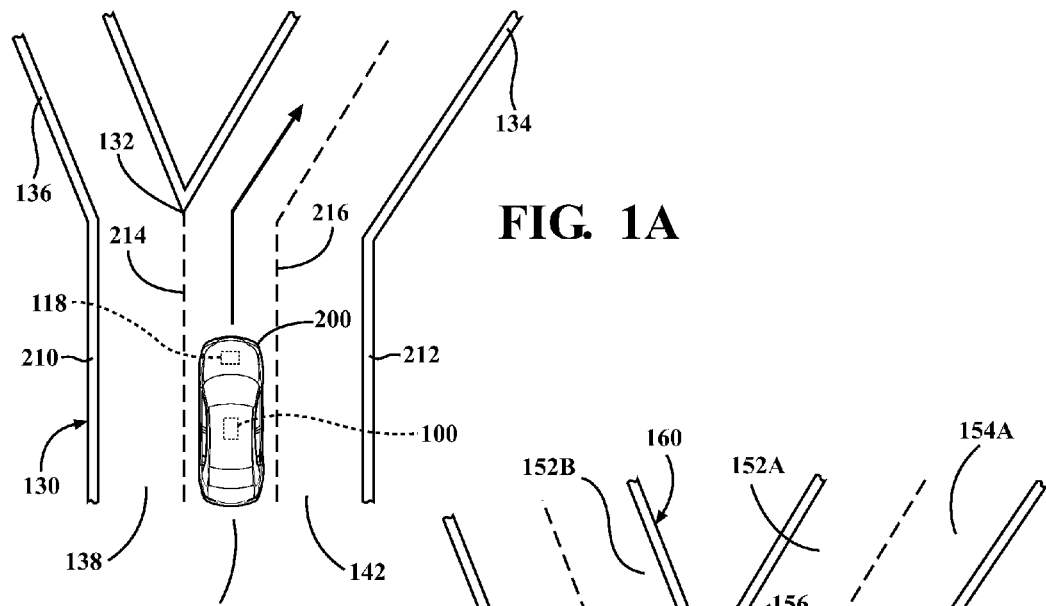
FIGS. 1A, 1B, and 1C are pictorial representations of different roadway junctions.

The present method and apparatus which will be described hereafter are used to predict the most probable path that a vehicle 100 traveling along a multilane roadway 130 will take upon reaching a junction or stub 132 in the roadway 130 where the roadway 130 splits or divides into at least one or a plurality of sub-paths, with one sub-path 136, 158, 174 being shown by way of example in FIGS. 1A, 1B, and 1C, respectively. As shown in FIG. 1, the rootpath 134 continues after the stub 132 as a two lane roadway.

The roadway 130 includes a plurality of lanes, with three lanes 138, 140, and 142 being shown by way of example. Two, four, and more than four lanes may also be included in the roadway 130. In FIG. 1A, the rootpath 134 includes two lanes 140 and 142; while the sub-path 136 includes a single lane 138.

Figure 1B:
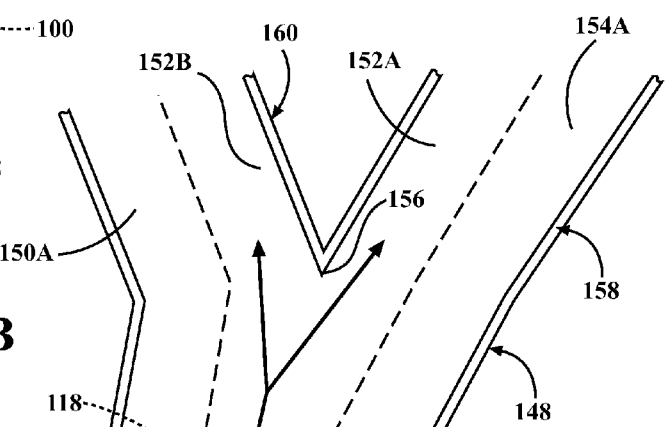

FIG. 1B depicts a different roadway 148, which includes a plurality of individual lanes, with three lanes 150, 152 and 154 being shown by way of example. In this depiction of the roadway 148, lanes 150, 152 and 154 in the roadway 148 split at a junction or stub 156 into two roadways 158 and 160 where roadway 158 includes a continuation 154A of the inner lane 154 and a continuation 152A of the center lane 152. The second roadway 160 also includes two lanes after the junction or stub 156, including a continuation 150A of the outer lane 150 as well as a continuation or browser of the center lane 152 hereafter referred to by reference number 152B. In the examples, one of the roadways 158 and 160, such as roadway 160, will carry the same route number (i.e. I-96) as the roadway 148 and remain the rootpath of the vehicle. The other roadway 158 is a sub-path.

Figure 1C:
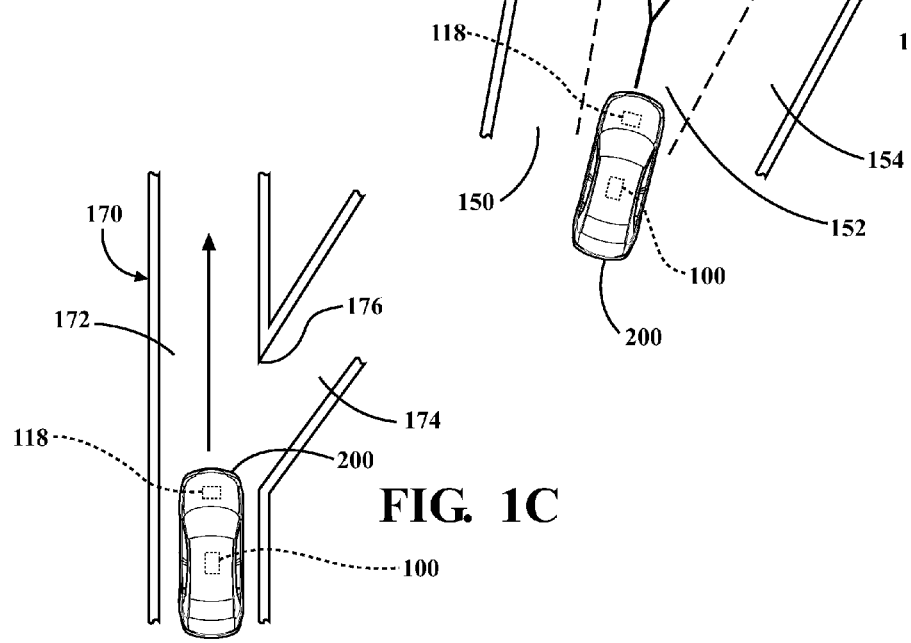

Another type of roadway 170 is shown in FIG. 1C. The roadway 170 includes a single lane 172 and a single sub-path 174 proceeding from junction or stub 176.

The various roadways 130, 148 and 170 will be used in conjunction with the following description of the process or operational steps performed by the method and apparatus to clarify the understanding of the method and apparatus.

Figure 2:
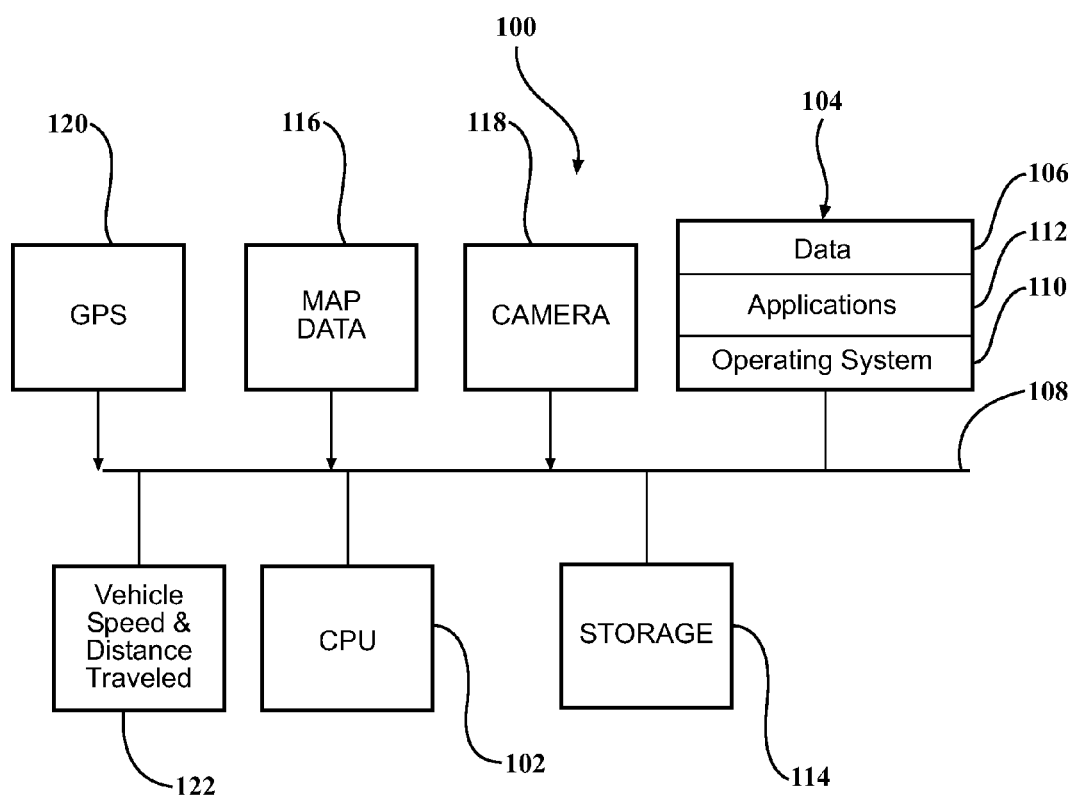
FIG. 2 is a block diagram of a computing device for implementing the present method and apparatus.

FIG. 2 is a block diagram of a computing device 100 for implementing the present most probable path prediction and control loss preview method and apparatus. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. The memory 104 in the computing device 100 can be a random access memory device (RAM) or any other suitable type of storage device. The memory 104 can include data 106 that is accessed by the CPU 102 using a bus 108.

The memory 104 can also include an operating system 110 and installed applications 112. The installed applications 112 can include programs that permit the CPU 102 to perform the methods described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be coupled to one or more sensors 116, 118, 120 and 122. The sensors 116, 118, 120, and 122 can capture data and/or signals for processing by an inertial measurement unit (IMU), a dead-reckoning system, a global navigation satellite system (GPS), a light detection and ranging (LIDAR) system, a radar system, a sonar system, an image-based sensor system, or any other type of system capable of capturing information specific to the environment surrounding a vehicle, including features of the route being traveled by the vehicle, or other localized position data and/or signals and outputting corresponding data and/or signals to the CPU 102.

The sensors 118 and 120 can also capture data representative of changes in x, y, and z-axis position, velocity, acceleration, rotation angle, and rotational angular rate for the vehicle. If the sensors 118 and 120 capture data for a dead-reckoning system, data relating to wheel revolution speeds, travel distance, steering angle, and steering angular rate of change can be captured. If the sensors 118 and 120 capture signals for a GPS, a receiver can calculate vehicle position and velocity estimated in global coordinates. A plurality of satellites can be used to estimate the vehicle's position and velocity using three-dimensional triangulation and time estimation.

FIG. 1 shows a schematic of a vehicle 200 including the computing device 100 described in FIG. 2. The computing device 100 can be located within the vehicle 200 as shown in FIG. 1 or can be located remotely from the vehicle 200 in an alternate location (not shown). If the computing device 100 is located remotely from the vehicle, the vehicle 200 can include the capability of communicating with the computing device 100.

The vehicle 200 can also include a plurality of sensors, such as the sensors 116 described in reference to FIG. 2. One or more of the sensors 120 and 122 can be configured to capture changes in velocity, acceleration, wheel revolution speed, and distance to objects within the surrounding environment for use by the computing device 100 to estimate position and orientation of the vehicle, steering angle for a dead-reckoning system, images for processing by an image sensor, vehicle position in global coordinates based on signals from a plurality of satellites, or any other data and/or signals that could be used to determine the current state of the vehicle or determine the position of the vehicle 200 in respect to its environment.

For example, if the sensors 118 are configured to capture data for use by a black and white camera or by a LIDAR system, the sensors 118 can capture data related to laser returns from physical objects in the area surrounding the vehicle 200 with ranging distances calculated by measuring the time it takes for a signal to return to the sensor 118. Laser or light returns can include the backscattered light reflected by objects hit by a source of light, e.g. laser light, being emitted by the sensors 118 or another source on or proximate to the vehicle 200. Once the light is reflected by an object, the sensors 118 can capture intensity values and reflectivity of each point on the object to be used for analyzing and classifying the object, for example, by the processor 102, one of the applications 112 stored within or accessible to the computing device 100.

The lanes in the roadway are assigned unique, incremental lane numbers, starting with one of the left most or right more lanes, and incrementing or decrementing the lane numbers for each lane to the opposite one of the right most or left most lanes. By example only, the lanes 138, 140 and 142 in the roadway 130 shown in FIG. 1 will be respectively designated with lane ID 0 for the left most lane 138, lane ID 1 for the center lane 140, and lane ID 2 for the right most lane 142. M represents the current number of lanes in the roadway 130 on which the vehicle 200 is traveling. The number of lanes can be obtained from map data 116. The map data 116 can be digital map information stored in the memory 104 of the computing device 100, stored in the external storage 114, or can be made available to the processor 102 from a remote location, such as by wireless transmission from a digital map data source. The map data 116 can include the existence and the location of stubs or splits in a roadway, as well as the distance of the stubs from predetermined locations along the roadway in advance of each stub, and the number of lanes in all sub-paths and the rootpath after a stub junction. The number of lanes in the roadway can also be obtained from the camera 118 for a small number of lanes in the roadway 130, such as two lanes, such that the camera 118 can detect the entire roadway from a left most lane marker 210 to right most lane marker 212 including any center-lane markers 214 and 216.

Figure 3:
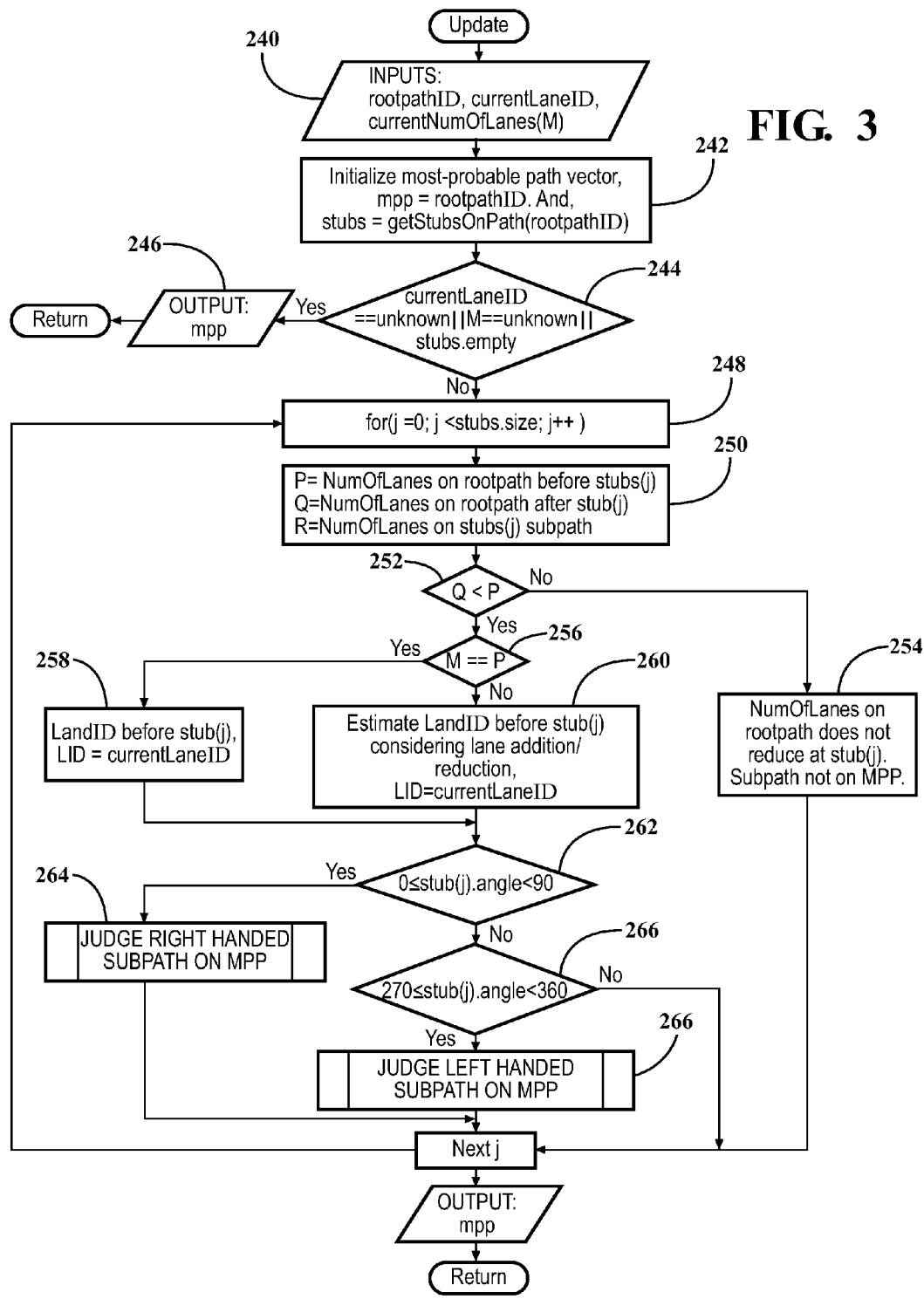
FIG. 3 is a logic flowchart of the process steps performed by the present method and apparatus.
Figure 4:
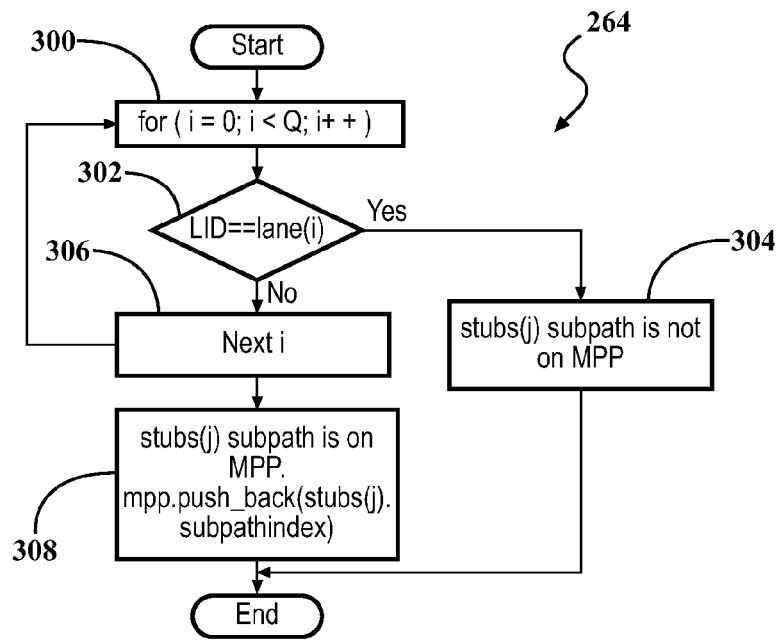
FIGS. 4 and 5 are logic flowcharts depicting sub-routines used in the implementation of the logic flowchart shown in FIG. 3, for detecting a left handed sub-path and right handed sub-path, respectively.
Figure 5:
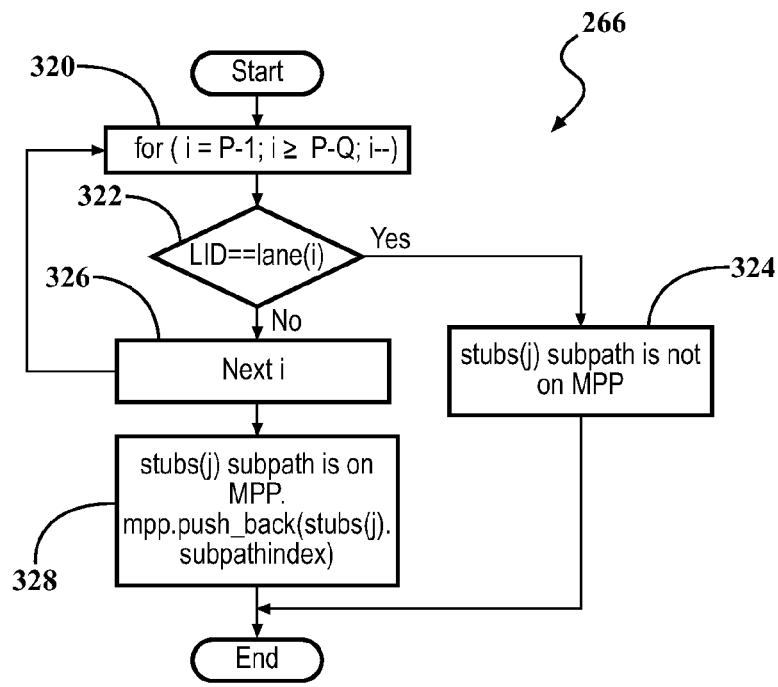

Referring now to FIGS. 3, 4, and 5, there is depicted the sequence steps performed by the method and apparatus in determining the most probable path of the vehicle 200 past the junction or stub 132 in the roadway 130 shown in FIG. 1A. This is based on the on the rootpath lane identity of the vehicle, the number of lanes in the at least one sub-path after the upcoming junction, the number of lanes in the rootpath before the junction, the number of lanes in the rootpath after the junction, and the direction of the sub-path with respect to the rootpath after the junction.

In step 240, the CPU 102 receives inputs specifying the rootpath ID of the vehicle 200 on the roadway 130, and the current lane ID of the vehicle 200 in the roadway 130. Since the vehicle 200 is shown traveling along the center lane 140 in FIG. 1A, the current lane ID is "1". The current number of lanes (M)=3 obtained from the map data 116 is also supplied to the CPU 102.

The CPU 102 in step 242 then initializes the most probable vector where the most probable path equals the rootpath ID, 1 in the present example shown in FIG. 1A. The CPU 102 also gets any stubs, such as junction or stub 132 on the rootpath ahead of the vehicle within a predetermined distance, such as 500 meters, for example. Such junction or stub data can be acquired from the map data 116.

In step 244, the CPU 102 tests the current lane ID if unknown, the number of lanes (M) if unknown, and the lack of stubs ahead of the vehicle 200 within the predetermined distance. If the determination from step 244 is yes, the CPU 102 outputs the most probable path in step 246.

Alternately, if the determination in step 244 is no, that is, the current lane ID is known, the number of lanes (M) are known and there is a stub within the predetermined distance ahead of the vehicle, the CPU 102 advances to step 248 which starts a subroutine to determine, in step 250, the number of lanes on the rootpath before the stub 132 (denoted by reference character P), the number of lanes on the rootpath after the stub 132, (denoted by reference character Q) and the number of lanes on the sub-paths 134 and 136, (denoted by reference character R). The method then tests in step 252 whether Q is less than P, that is, whether the number of lanes on the rootpath after the stub are less than the number of lanes on the rootpath before the stub 132. If the determination from step 252 is no, that is, Q is not less than P, the method determines that in step 254 that the number of lanes on the rootpath does not reduce at the stub such that the upcoming sub-path is not the most probable path that the vehicle 200 will take. In the roadway 130 example shown in FIG. 1A, P=3 lanes, Q=2, as the rootpath of the vehicle 200 after the junction or stub 132 includes two lanes.

Similarly, in the roadway 148 example shown in FIG. 1B, P=3 lanes in the vehicle rootpath, while Q=2.

However, in the roadway 170 example in FIG. 1C, both P and Q=1. Thus, the determination by the CPU 102 in step 254 is that the sub-path 174 is not the most probable path of the vehicle 200.

In the roadway examples in FIGS. 1A and 1B, the determination from step 252 is yes. The CPU 102 then tests in step 256 whether the current number of lanes in the roadway matches the number of lanes on the rootpath. If M=P, that is, the number of lanes in the roadway equals the number of lanes in the rootpath before the stub, the yes determination causes the CPU 102 to advance to step 258 where the lane ID of the vehicle before the stub is set be the current lane ID.

Alternately, if M does not match P, the method advances to step 260 where the CPU 102 estimates the lane ID before the stub, such as stub 132 in FIG. 1A considering a lane addition or a lane reduction. The lane ID is then set to the current lane ID input in step 240.

Next, in step 262, the method determines the angle of the sub-paths, referred to as "stub angle" after the junction or stub with respect a longitudinal axis depicting zero degrees running along the current rootpath of the vehicle.

In the roadway 130 example in FIG. 1A, using the map data from the GPS 120, the CPU 102 tests the angle of the sub-path 136 after the stub 132. As the angle of the sub-path 136 relative to a longitudinal axis of the rootpath of the vehicle 200 in the roadway 130 is between 270° and 360°, the test is yes and the CPU 102 advances to a subroutine 264 which judges whether the left handed or left directed sub-path is on the most probable path of the vehicle.

Similarly, if the decision from step 262 is no, that is, the stub angle of the sub-path after the junction is not between 0° and 90°, the method determines in step 266 whether the stub angle is between 270° and 360°. If the determination is yes, the method advances to a subroutine 266, shown in FIG. 5, which judges whether the left-handed sub-path is the most probable path of the vehicle 200 on the roadway 130 after the junction or stub 132.

Referring briefly to FIG. 4, in the subroutine 264, the method in step 300 starts a loop for a right-handed directed sub-path by setting the variable i to equal to 0, where i is less than Q, the number of lanes on the rootpath after the junction. In the roadway 148 example shown in FIG. 1B, the sub-path 158 is a right handed sub-path as defined above. Assuming for example in the roadway 148 that the sub-path 158 contains only a single lane 154A, the sub-routine in FIG. 4 sets i equal 0 and checks that i is less than Q, the number of lanes on the rootpath 152 after the junction 156. The lane identity which, for the vehicle in the center lane of a three-lane roadway, is 1, is checked with the value of i. Since i does not equal 1, the loop returns through step 306 by incrementing i by 1 to i equals 1. The lane I.D. is again checked in step 302 with the lane (i) value. Since both the lane I.D. and the lane (i) equal 1, control switches to step 304 and a determination is made that the sub-path 158 is not on the most probable path (MPP) of the vehicle 100.

For the same roadway example in FIG. 1B, where only sub-path 154 continues after the junction 156 in the roadway 158, if the vehicle 100 is in the rightmost lane the lane I/D. (L.I.D.) equals 2. Repeating the subroutine 264, i is set to 0 and the lane I.D. is checked with the lane (i) value. Since the lane I.D. equals 2 does not equal the lane (i) value of 0 the subroutine reverts to step 300 by incrementing i by 1 to i equals 1. Step 302 is repeated to check if the lane I.D. of 2 matches the lane (i) of 1. Since this is still a no, step 306 is repeated to increment i to i equals 2. However, in step 300, i must be less than Q, the number of lanes on the rootpath 160 after the junction 156. Since Q equals 2, control switches from step 306 to step 308 to indicate the sub-path 158 is on the most probable path (MPP) of the vehicle 100.

Subroutine 266 in FIG. 5 checks for a left hand stub, such as that shown in FIG. 1A. In subroutine 266, in step 320, a variable i is set to p−1, where p is the number of lanes in the rootpath 134 of the vehicle prior to the junction 132. In FIG. 1A, P equals 3. Therefore, i is set to 3−1=2. Step 320 also insures that i remains greater than P−Q which in this instance is 3−2=1.

With the variable i set to 2, the lane identity is compared with the lane (i) value in step 322. Since the vehicle 100 is in the center lane (lane I.D.), in the example shown in FIG. 1A, the lane I.D. of 1 does not match the i=2 so that control reverts through step 226 to decrement i by 1 to i equals 1. Step 322 is then repeated to see if the lane I.D. equals 1 matches the lane (i) value of 1. Since this is a match, step 324 indicates that the stub subpath 136 is not on the most probable path (MPP) of the vehicle 100.

Alternately, if the vehicle 100 in FIG. 1A is assumed to be in the leftmost or outer lane 138, the subroutine 266 will initialize i to be 3−1=2. The lane I.D. of 0, since the vehicle is in the leftmost lane, is then compared with the lane (i) value of 2. Since there is no match, next i is selected in step 326 by decrementing the value of I by 1 in step 320 so that (i) now equals 1. The lane I.D. of 0 is compared with the lane (i) value of 1. Since there is no match, step 326 is repeated to select the next i value. However, i, according to step 320, must remain greater than or equal to the value of P−Q (3−2=1). Since the lane I.D. of 0 equals the (i) value of 0 the third time through the loop in subroutine 266, a determination is made that the lane I.D. does not match the lane (i) value. Since i must remain greater than or equal to the value of P−Q (3−2=1), control falls through step 326 to step 328 indicating that the subpath 136 is on the most probable path (MPP) of the vehicle 100.

In the event of a three or more than three way split at a junction, where the start of the junctions are essentially lined up with each other, the subroutines 264 and 266 will be used when a left handed subpath or a right handed subpath is found with respect to the rootpath of the vehicle. The subroutines 264 and 266 then compare the rootpath with one subpath and then the rootpath with the other subpath to determine the most probable path of the vehicle.

In the FIG. 1B example, the most probable path of the vehicle 100, when the vehicle 100 is traveling in the center lane of a three lane roadway and the roadway splits at the junction into two paths, each containing two lanes, that is, the center lane of the rootpath splits and continues in both of the roadways after the junction. The vehicle 100, traveling in the center lane, could follow the left directed roadway 160 or just as easily the right directed roadway 158. To address this issue, an assumption is made that the vehicle 100 will continue on the road designation assigned to the rootpath after the junction or stub (i.e., I-96).

Referring back to the flow diagram in FIG. 3, after the completion of either of the subroutines 264 and 266, control reverts for the next variable j in step 248. Using the process steps for FIGS. 3, 4, and 5, the method and apparatus determine the most probable path (MPP) for the vehicle 200 on a roadway, such as roadway 130 in FIG. 1A.

Figure 6:
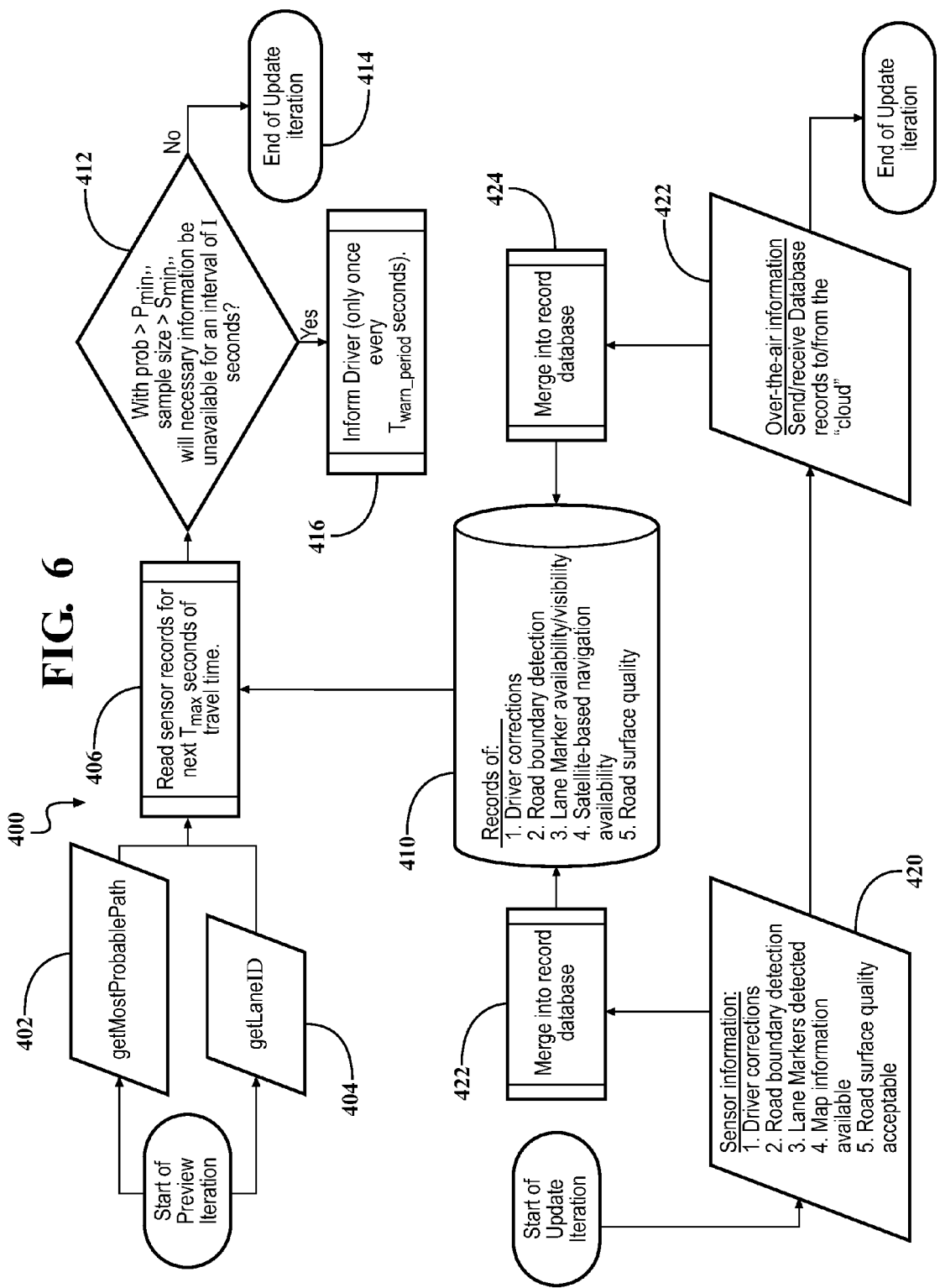
FIG. 6 is a logic flowchart of a control loss preview process performed by the present method and apparatus.

This most probable path information can be output to a process sequence shown in FIG. 6, which relates to an automatic vehicle control loss of vehicle function. The most probable path information is input in step 402 along with a current lane ID in step 404.

The method and apparatus then reads the sensor records in step 406 to determine, based on the current vehicle speed, the road surface features, such as the existence of the lane markers 210, 212, 214, and 216 in the example of FIG. 1A for the next predetermined seconds of travel time based on the current speed of the vehicle as calculated from sensor 122.

As shown in FIG. 6, the sensor records in step 410, include driver corrections to the path of the vehicle where the driver overtakes control of the vehicle from the automatic vehicle control, road boundary detection, lane marker availability and visibility, satellite base navigation availability and road surface quality, such as rainy, snowy, ice, clear, etc. Based on the sensor records for the next predetermined amount of travel time of the vehicle 200 along the roadway 130, including the most probable path of the vehicle 200 along the roadway 130 or along the sub-path 136 after the stub or junction 132, the method and apparatus in step 412 determines whether the necessary information to continue automatic control of the vehicle will be unavailable for an interval of a predetermined number of seconds, such as five seconds. If the determination is no, the end of the update iteration ends in step 414. If it is determined that the necessary information will not be available for the predetermined time interval, in step 412, the method and apparatus, in step 416, generates a warning, which can be an audible, visual, or haptic warning, or combinations thereof, to inform the driver of the upcoming automatic vehicle control information loss so as to give the driver sufficient time to retake control of the vehicle.

The warning from step 416 can be repeated once for every predetermined amount of time. The warning can be issued at a constant rate or at an increasing rate, increasing volume, increasing visibility or increasing haptic variation, as the predetermined travel time reaches the maximum predetermined travel time.

The sensor records in step 410 can be stored or made available in a number of ways. In step 420, in FIG. 6, the sensor information is obtained from previous driver corrections, road boundary detections, lane marker detections, available map information, and road surface quality acceptability on previous travel times of the vehicle 200 along the same portion of the roadway. Such factors may also take into account time of day, day of week, and other factors. This information is merged into a record database in step 422, which can be stored in the memory 104 or external storage memory 114 in the computer device 100. Alternately, the sensor information from step 420 can be sent remotely via wireless transmission using available cellular networks, Wi-Fi or other wireless networks, to a remote database in step 422. The sensor information from step 420 can be stored and accumulated in step 422 with similar sensor information from other vehicles traveling along the same portion of the road, at the same time of day, day of week, etc. The information from step 422 is merged into a record database 424, which can be remote from the vehicle 200 and then wirelessly transmitted to the vehicle 200 to form part of the onboard vehicle sensor records in step 410.

Figure 7:
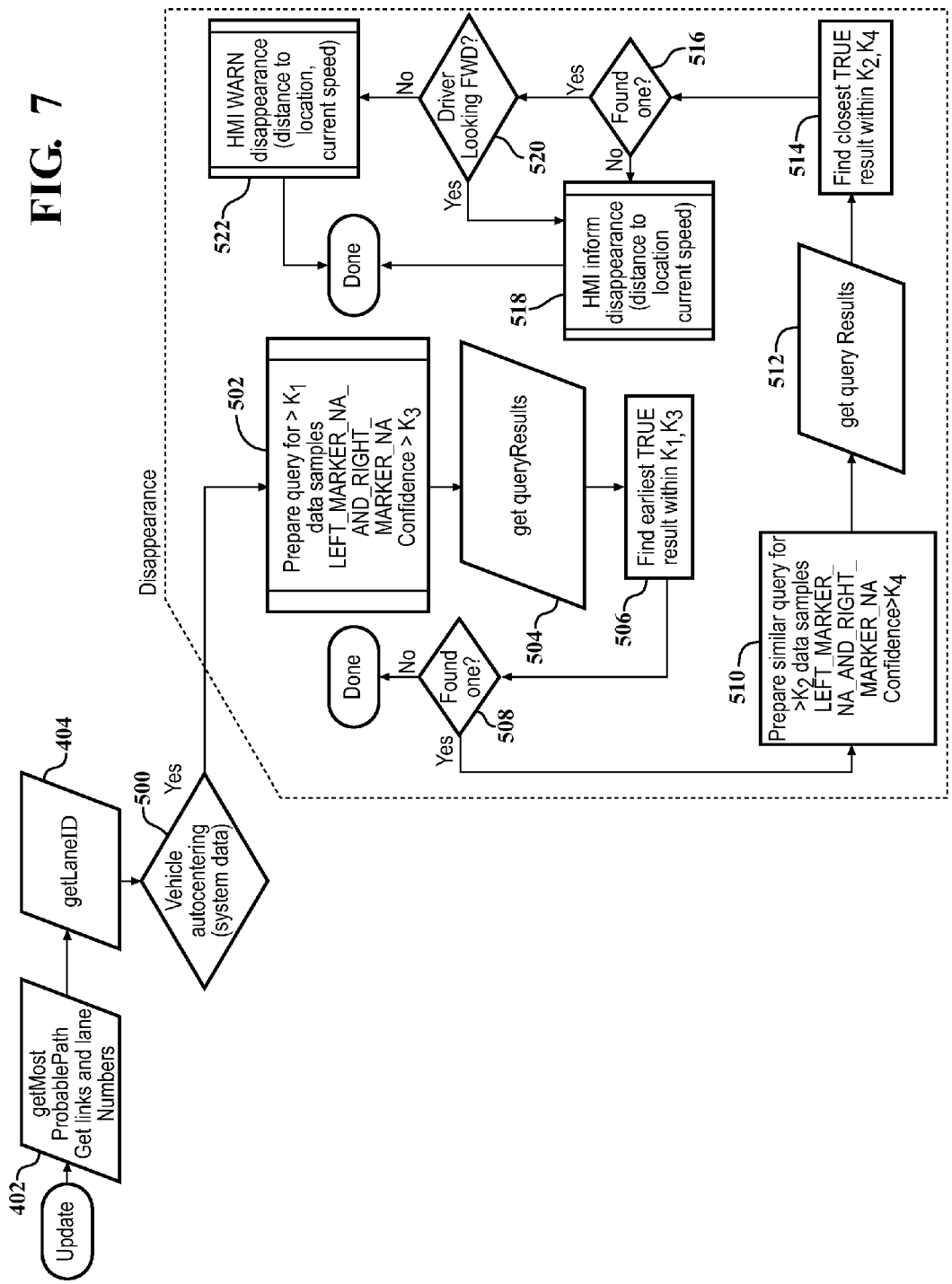
FIG. 7 is a process flow diagram of a lane marker preview sequence performed by the method and apparatus.

As shown in FIG. 7, steps 402 and 404 from FIG. 6 are repeated to obtain the most probable path of the vehicle 200 in a roadway and the lane ID of the instantaneous position of the vehicle in the roadway. Next, in step 500, the CPU 102 determines whether the vehicle auto-centering feature is activated. This system centers the vehicle between two adjacent lane markers during automatic driving control without using driver intervention. Next, if the vehicle auto-centering is on, the CPU 102 advances to step 502 to prepare a query for a predetermined number of data samples for the left lane marker and the right lane marker for a predetermined confidence threshold. A query distance is determined based on the current speed of the vehicle and a required warning ahead timing to provide a warning to the driver of the vehicle to retake control of the vehicle. Next, the most probable path information is obtained from step 402. Map data 116 is obtained to determine the mapped links along the most probable path up to the query distance.

For each map link and up the query distance, the following steps are repeated. If the number of lanes changes from link to link, an assumption is made that with equal probability the difference in the number of lanes is added or subtracted to or from the left or right lane and there is no lane change unless the lanes are lost for the host vehicle. Subtraction of a lane requires redistributing probabilities from the lost lane or lanes to the closest remaining lanes. For example, if the roadway increases from two lanes to three lanes in a map link up to the query distance, a lane probability of, for example, 0.1, 0.9 is then determined as ½(0, 0.1, 0.9)+½ (0.1, 0.9, 0). If five lanes converge and reduce to two lanes, a probability example of (0. 0.5, 0.5, 0, 0) is recalculated for two lanes as ½(0, 0.5+(0.5+ 0+0))+½((0+0.5+0.5)+0, 0).

Next, the length of the last link is determined. If the length is known, then additional lengths are not added when the requested offset is reached. If the total length is less than the query distance, then the query preparation process is finished. Otherwise, the query is ready for use.

Once the query results are obtained, the method finds the earliest valid result within the queries in step 506. Step 508 is then executed. If a valid result is not found, the search for the disappearance of road lane markers is done. If a valid result is found according to the outcome of step 508, a similar query is prepared in step 510 with an increased query distance. The results are processed according to step 504 in step 512. The CPU 102 then determines the closest true result within all of the results in step 514. If a result is not found, in step 516, the CPU 102 in the vehicle 200 as shown in step 518 determines the distance to the location of the road lane marker disappearance at the current speed of the vehicle. The human machine interface then using audible, visual, and/or haptic alarms provides the warnings to the driver.

If a true result is found in step 516, the CPU 102 determines that the driver is looking forward to the front of the vehicle in step 520. This can be obtained by a camera located within the vehicle or other types of sensors to determine the orientation of the driver's head with respect to the forward direction of travel of the vehicle. The CPU 102 then activates the human machine interface to warn the driver of the vehicle in step 522 via audible, visual, and/or haptic alerts of the distance to the predicted disappearance of the road lane markers, which will render the vehicle auto-centering function inactive and require the driver to retake control of the vehicle.

What is claimed is:

1. A computer implemented method of predicting a most probable path of a vehicle traveling in a multi-lane roadway and approaching an upcoming junction in the roadway, the method comprising:
   determining, based on input from at least one sensor, a location of a vehicle traveling in the roadway;
   identifying the upcoming junction in the roadway forward of the vehicle, where a number of lanes in the roadway changes at the upcoming junction into a rootpath and at least one sub-path, the at least one sub-path having at least one lane;
   determining a first number of lanes in the rootpath before the upcoming junction;
   determining a second number of lanes in the rootpath after the upcoming junction;
   determining a third number of lanes in the at least one sub-path after the upcoming junction;
   determining a direction of the at least one sub-path with respect to the rootpath; and
   determining, based on the first, second, and third numbers of lanes, and the direction of the at least one sub-path, the most probable path of the vehicle at the upcoming junction.

2. The method of claim 1 further comprising:
   determining an angular direction of the at least one sub-path relative to the roadway in which the vehicle is traveling.

3. The method of claim 2 wherein the step of determining the angular direction of the at least one sub-path comprises:
   determining one of a left hand sub-path direction and a right hand sub-path direction with respect to the roadway in which the vehicle is travelling.

4. The method of claim 2 wherein the step of determining the most probable path of the vehicle at the upcoming junction comprises:
   depending upon the angular direction of the at least one sub-path after the junction, comparing a rootpath lane identity of the vehicle with unique lane numbers in the roadway to determine if the at least one sub-path is or is not the most probable path of the vehicle after the junction.

5. The method of claim 4 wherein the rootpath lane identity of the vehicle in the roadway is determined by:
   assigning incremental unique lane numbers starting with one of a left most and a right most lane for each lane in the roadway to the other of the right most and the left most lane in the roadway.

6. The method of claim 1 further comprising:
outputting roadway related information to a vehicle driver for the most probable path of the vehicle after the upcoming junction prior to the vehicle reaching the upcoming junction.

7. A driver assistance apparatus, comprising:
at least one sensor for detecting roadway lane markers;
a computing device in communication with the at least one sensor, and including at least one processor for controlling the computing device;
a memory for storing data and program instructions used by the at least one processor, wherein the at least one processor is configured to execute instructions stored in the memory to:
determine a current location of a vehicle traveling in a multi-lane roadway;
determine, based on input from the at least one sensor, a current lane identity of the vehicle traveling in the roadway;
identify, using map data and the current location of the vehicle, an upcoming junction in the road where a number of lanes in the roadway changes at the upcoming junction into a rootpath and at least one sub-path, the at least one sub-path having at least one lane;
determine a lane identity of the rootpath;
determine a first number of lanes in the rootpath before the upcoming junction;
determine a second number of lanes in a rootpath after the upcoming junction;
determine a third number of lanes in the at least one sub-path after the upcoming junction;
determine a direction of the at least one sub-path with respect to the rootpath; and
determine, based on the lane identity of the rootpath, the first, second, and third numbers of lanes, and the direction of the at least one sub-path, a most probable path of the vehicle.

8. The apparatus of claim 7 wherein the at least one processor is configured to determine an angular direction of the at least one sub-path relative to the roadway in which the vehicle is traveling; and
depending upon the angular direction of the at least one sub-path after the junction, compare the rootpath lane identity of the vehicle with unique lane numbers to determine if the at least one sub-path is or is not the most probable path of the vehicle after the junction.

9. The apparatus of claim 7 wherein the at least one processor is configured to use the most probable path for at least one of:
detecting roadway features including sharp curves, lane-ending and merges with other roadways;
informing a vehicle driver of the roadway features in advance;
using the roadway features to modify the control of a vehicle.

10. The apparatus of claim 7 where the at least one processor predicts lane identity of a vehicle just prior to a junction wherein the number of lanes just prior to the junction is different than a current number of lanes at an instantaneous vehicle location.

11. A computer implemented method of predicting a loss of an automated vehicle control, the method comprising:
obtaining sensor output records stored in a memory of a computing device and based on one or more previous: driver corrections, road boundary detection, lane marker availability, satellite navigation availability, map information availability, and road surface quality detection;
determining, based on input from at least one sensor disposed on the vehicle, a current lane identity of a vehicle traveling in a roadway containing a plurality of lanes;
determining, based on the sensor output associated with a next predetermined travel distance of the vehicle along the roadway, if vehicle control information will be unavailable for a predetermined time interval;
when vehicle control information is determined to be unavailable, sending an indication to a driver to take control of the vehicle;
identifying an upcoming junction in the roadway forward of the vehicle, where a number of lanes in the roadway changes at an upcoming junction into a rootpath and at least one sub-path, the at least one sub-path having at least one lane; and
determining a most probable path of the vehicle at the upcoming junction based on the current lane identity and a number of lanes in the at least one sub-path after the upcoming junction.

* * * * *